United States Patent
Yoshimi

(10) Patent No.: US 7,085,920 B2
(45) Date of Patent: Aug. 1, 2006

(54) BRANCH PREDICTION METHOD, ARITHMETIC AND LOGIC UNIT, AND INFORMATION PROCESSING APPARATUS FOR PERFORMING BRACH PREDICTION AT THE TIME OF OCCURRENCE OF A BRANCH INSTRUCTION

(75) Inventor: Koichi Yoshimi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 395 days.

(21) Appl. No.: 09/736,163

(22) Filed: Dec. 15, 2000

(65) Prior Publication Data

US 2001/0011346 A1    Aug. 2, 2001

(30) Foreign Application Priority Data

Feb. 2, 2000  (JP) ............................. 2000-025769
Feb. 22, 2000 (JP) ............................. 2000-044642

(51) Int. Cl.
   G06F 9/44    (2006.01)
(52) U.S. Cl. ........................ 712/239; 712/240
(58) Field of Classification Search ............... 712/238, 712/239, 240
   See application file for complete search history.

(56) References Cited

U.S. PATENT DOCUMENTS

| 5,228,131 | A  | * | 7/1993  | Ueda et al. ............... 712/240 |
| 5,394,529 | A  | * | 2/1995  | Brown et al. ............... 712/240 |
| 5,553,253 | A  |   | 9/1996  | Pan et al. |
| 5,822,575 | A  | * | 10/1998 | Tran ........................... 712/239 |
| 6,108,775 | A  | * | 8/2000  | Shiell et al. ................ 712/240 |
| 6,233,678 | B1 |   | 5/2001  | Bala ........................... 712/240 |
| 6,502,188 | B1 | * | 12/2002 | Zuraski et al. ............. 712/234 |
| 6,701,426 | B1 | * | 3/2004  | Ries et al. .................. 712/239 |

FOREIGN PATENT DOCUMENTS

| JP | 3-235121   | 10/1991 |
| JP | 4-239917   | 8/1992  |
| JP | 4-245334   | 9/1992  |
| JP | 6-324866   | 11/1994 |
| JP | 08-110857  | 4/1996  |
| JP | 10-198563  | 7/1998  |
| JP | 10-240527  | 9/1998  |
| JP | 10-260833  | 9/1998  |

OTHER PUBLICATIONS

Rosenberg, Jerry M. "Computers, Information Processing & Telecommunications". Second Edition. John Wiley & Songs: New York, © 1987. pp. 292 and 484.*

* cited by examiner

Primary Examiner—Eddie Chan
Assistant Examiner—Aimee J. Li
(74) Attorney, Agent, or Firm—Staas & Halsey LLP

(57) ABSTRACT

A branch prediction method including determining branch prediction data indicating a state of branch prediction according to whether a branch is actually made, performing branch prediction according to the branch prediction data, and correcting the branch prediction data according to whether the branch is actually made.

12 Claims, 19 Drawing Sheets

FIG. 5

| n | n-1 | n-2 | . . . . | 3 | 2 | 1 |
|---|-----|-----|---------|---|---|---|
| 0 | 1 | 1 | . . . . | 0 | 1 | 0 |

FIG.8

|  | t1 | | t2 | | t3 | | t4 | | t5 |
|---|---|---|---|---|---|---|---|---|---|
| A-BRANCH | TAKEN | → | TAKEN | → | NOT TAKEN | → | TAKEN | → | NOT TAKEN |

| | | | | | | | |
|---|---|---|---|---|---|---|---|
| 0 | 0 | 0 | 0 | 0 | 0 | 0 | 1 |
| 0 | 0 | 0 | 0 | 0 | 0 | 1 | 1 |
| 0 | 0 | 0 | 0 | 0 | 1 | 1 | 0 |
| 0 | 0 | 0 | 0 | 1 | 1 | 0 | 1 |
| 0 | 0 | 0 | 1 | 1 | 0 | 1 | 0 |

FIG. 9

| a | b | c |
|---|---|---|
| ax | b1 | 01 |
| ax | b2 | 00 |
| ax | b3 |    |
| ⋮  | ⋮  | ⋮  |
| ax | bm | 11 |

| r | s |
|---|---|
| 0 0 0 0 0 0 0 0 | s1 |
| 0 0 0 0 0 0 0 1 | s2 |
| | |
| ⋮ | ⋮ |
| | |
| | |
| 0 1 1 1 1 1 1 1 | st-1 |
| 1 1 1 1 1 1 1 1 | st | n BITS

| r \ OUTPUT | 00 | 01 | 10 | 11 |
|---|---|---|---|---|
| 00 | 1 | 0 | 0 | 0 |
| 01 | 0 | 0 | 1 | 0 |
| 10 | 0 | 0 | 1 | 0 |
| 11 | 0 | 0 | 1 | 0 |

205-1
205-m
205-X

BRANCH PREDICTION METHOD, ARITHMETIC AND LOGIC UNIT, AND INFORMATION PROCESSING APPARATUS FOR PERFORMING BRACH PREDICTION AT THE TIME OF OCCURRENCE OF A BRANCH INSTRUCTION

BACKGROUND OF THE INVENTION

1. Field of the Invention

The present invention relates to a branch prediction method, an arithmetic and logic unit, and an information processing apparatus, and, in particular, to a branch prediction method, an arithmetic and logic unit, and an information processing apparatus for performing branch prediction at a time of occurrence of a branch instruction.

Recently, in most microprocessors, a pipeline method or a superscalar pipeline method is used to increase a processing speed. Further, in microprocessors, in a case where a branch instruction occurs for increasing a processing speed, processing is continued as a result of a branch direction being predicted according to a degree of branch, and, thus, a processing speed is prevented from decreasing.

However, when branch prediction is performed in a microprocessor employing a pipeline method, a branch prediction miss may occur. When a branch prediction miss occurs, a pipeline bubble not participating the current processing occurs in each slot of the pipeline, processing of instructions is delayed, and, thereby, processing performance is remarkably degraded.

In particular, due to a sharp improvement of operation frequency of a microprocessor, an entire performance of the microprocessor is remarkably affected by such a delay of processing of instructions due to pipeline bubbles.

For the purpose of eliminating such a problem, various branch prediction methods have been proposed directed to a high hit rate of branch prediction. For example, a two-stage branch prediction method, an agree predictor, and so forth are known.

In such methods, learning is performed by detecting hit/miss of branch prediction. At this time, the number of detection cycles are needed to be performed until the number of misses corresponding to the number of bits of a branch prediction history register are detected and a branch prediction table is updated to a correct direction.

Accordingly, when a process of instructions is changed, branch prediction is made according to a result of learning for a previous process at first. Therefore, many misses of branch prediction occur immediately after a change of process, and this results in degradation of processing performance.

Especially, in processors employing a superscalar pipeline method, because a plurality of instructions are executed simultaneously, the number of branch perdition misses increases, and serious degradation of processing performance results. Accordingly, a method for easily reflecting a result of profiling to branch prediction is desired.

2. Description of the Related Art

FIG. 1 shows a block diagram of one example of an information processing apparatus in the related art.

The information processing apparatus 1 includes an arithmetic and logic unit 2, a main memory 3, a hard disk drive 4, an inputting unit 5, a display unit 6 and a system bus 7.

The arithmetic and logic unit 2 performs operations of data according to instructions. The main memory is used as a working area by the arithmetic and logic unit 2, and, data on which operations are carried, instructions, operation results and so forth are stored therein temporarily.

The hard disk drive 4 stores programs and data executed and used by the arithmetic and logic unit 2.

The inputting unit 5 includes a keyboard, a mouse, and so forth, and is used by a user for causing the information processing apparatus 1 to execute programs, and input data to the information processing apparatus 1.

The display unit 6 displays calculation/operation results of the arithmetic and logic unit 2 and so forth.

The system bus 7 connects the arithmetic and logic unit 2, main memory 3, hard disk drive 4, inputting unit 5 and display unit 6.

The arithmetic and logic unit 102 will now be described in detail.

FIG. 2 shows a block diagram of the arithmetic and logic unit 2.

The arithmetic and logic unit 2 includes a bus-interface unit 111, a secondary cache 112, an instruction fetch unit 113, an instruction decoder 114, an integer arithmetic part 115, a floating point arithmetic part 116, a functional unit 117, an internal bus 118, a data cache 119, a reorder buffer 120, a branch prediction control part 121 and an execution control part 122.

The bus-interface unit 111 acts as an interface between the arithmetic and logic unit 102 and system bus 7. Instructions from the system bus 105 are provided to the secondary cache 112 via the bus-interface unit 111.

The secondary cache 112 temporarily stores instructions from the system bus 105. Instructions stored in the secondary cache 112 are provided to the instruction fetch unit 113 in sequence.

The instruction fetch unit 113 fetches instructions from the secondary cache 112.

The instruction decoder 114 decodes instructions from the instruction fetch unit 113. Instructions decoded by the instruction decoder 114 are then provided to the integer arithmetic part 115, floating point arithmetic part 116 and functional unit 117.

The integer arithmetic part 115 performs integer arithmetic according to instructions from the instruction decoder 114. The floating point arithmetic part 116 performs floating point arithmetic according to instructions from the instruction decoder 114. The functional unit 117 performs predetermined functions according to instructions from the instruction decoder 114.

Arithmetic results of the integer arithmetic part 115, floating point arithmetic part 116 and functional arithmetic part 117 are provided to the internal bus 118.

Arithmetic results provided to the internal bus 118 are provided to the data cache 119 and reorder buffer 120.

The data cache 119 stores arithmetic results of the integer arithmetic part 115, floating point arithmetic part 116 and functional arithmetic part 117. Data stored in the data cache is stored by the secondary cache 112 via the bus interface 111.

The reorder buffer 120 stores reordered instructions.

The branch prediction part 121 predicts a branch direction when a branch instruction is provided.

The execution control part 122 controls operations of the entirety.

Branch instructions will now be described.

FIG. 3 illustrates branch instruction operations.

In FIG. 3, 'inst' denotes an ordinary instruction, while 'br' denotes a branch instruction.

In FIG. 3, instructions are described as 'insti, insti+1, . . . , brA, instj, instj+1, . . . , brB, instk, instk+1, . . , instl, instl+1, . . .', in the stated order.

The branch instruction 'brA' is an instruction for returning to the instruction 'insti' at the address A when a branch is made as shown in the figure, but for executing the instructions starting from the instruction 'brB' when the branch is not made.

The branch instruction 'brB' is an instruction for jumping to the instruction 'instl' at the address B when a branch is made, but for executing the instructions 'instk, instk+1, . . .' when the branch is not made.

The branch prediction part 121 will now be described.

FIG. 4 shows a block diagram of one example of the branch prediction part 121 in the related art.

The branch prediction part 121 includes index generating circuits 131, 132, a branch history register 133, a branch prediction information storage part 134, a tag comparing circuit 135, a tag determining circuit 136, and a prediction information generating circuit 137.

A branch instruction, a program count value and branch history information are provided to the index generating circuit 131.

The branch history register 133 stores past branch results.

Figure 5:
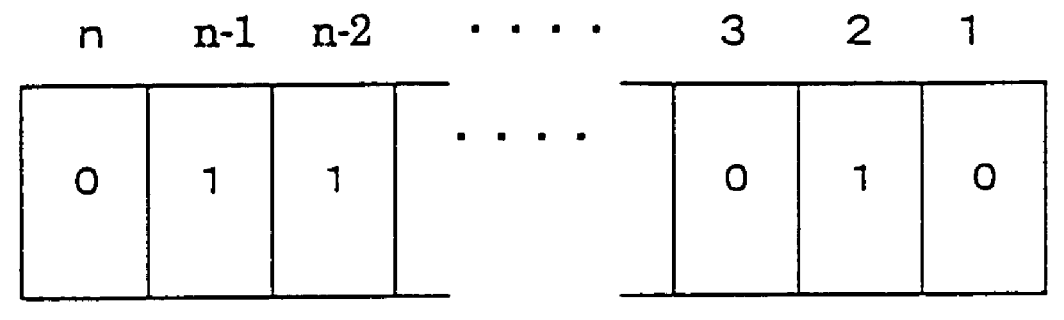

FIG. 5 shows an example of a data configuration of the branch history register 133.

The branch history register 133 includes an n-bit register.

The branch history register 133 stores a branch result n times ago at an n-th bit, a branch result n−1 times ago at an (n−v1)-th bit, . . . , a branch result twice ago at a second bit, and a branch result once ago (immediately before this time) at a first bit.

Each branch result is expressed by '0' or '1'. A branch result '1' is stored when the branch is actually made while a branch result '0' is stored when the branch is not actually made.

The branch history information stored in the branch history register 133 is provided to the index generating circuit 131 when a branch instruction occurs.

The index generating circuit 131 combines the branch instruction, program count value and branch history information, and generates index information. The index information generated by the index generating circuit 131 is used as an entry of the branch prediction information storage part 134.

The branch prediction information storage part 134 stores tag information 138 and branch prediction information 139. Each tag information 138 and branch prediction information are stored in a respective pair.

For the branch prediction information storage part 134, tag information 138 is determined by index information generated by the index generating circuit 131, and branch prediction information 139 corresponding to the thus-determined tag information is read out therefrom.

The branch prediction information 139 is information indicating a branch prediction direction.

Each branch prediction information 139 includes 2-bit information such as '00', '01', '10' or '11'.

The branch prediction information '11' indicates 'strongly taken', the branch prediction information '10' indicates 'weakly taken', the branch prediction information '01' indicates 'weakly not taken', and the branch prediction information '00' indicates 'strongly not taken'.

'Strongly taken' indicates a state in which a probability that a branch is made is large (the probability that the branch is made is largest).

'Weakly taken' indicates a state in which a probability that a branch is made is small (the probability that the branch is made is smaller).

'Weakly not taken' indicates a state in which a probability that a branch is not made is small (the probability that the branch is made is further smaller).

'Strongly not taken' indicates a state in which a probability that a branch is not made is large (the probability that the branch is made is smallest).

The branch prediction information 139 corresponding to the tag information 138 searched for from the branch prediction information storage part 134 is outputted from the branch prediction information storage part 134.

The branch prediction information 139 read out from the branch prediction information storage part 134 is provided to the prediction information generating circuit 137. The prediction information generating circuit 137 performs branch prediction based on the provided branch prediction information 39.

The result of the branch prediction performed by the prediction information generating circuit 137 includes 2-bit information, similar to the branch precaution information 139, such as '00', '01', '10' or '11'.

According to the above-mentioned branch prediction result, a branch prediction is made, and, instructions are executed in advance.

At this time, the branch prediction information 139 stored in the branch prediction information storage part 134 is updated according to a result of detection of hit/miss between the branch prediction and actual branch.

FIG. 6 illustrates a problem in the related art.

In FIG. 6, P1, P2 and P3 indicate programs of different processes, respectively.

When a switching is made from the program P1 to the program P2 at a time t0, because the processes of the programs P1 and P2 are different from one another, a branch prediction for the program P2 becomes inaccurate. A certain time T is needed until a branch prediction corresponding to the program P2 is made since the program P2 is started to be executed.

Accordingly, it is not possible to perform a precise branch prediction during the time T after the program is switched, and, thereby, it is not possible to execute the program efficiently.

FIG. 7 shows a block diagram of the branch prediction part 121 shown in FIG. 2 (in this case, it will be referred to as 121' in order to distinguish it from the part 121 shown in FIG. 4).

The branch prediction part 121' includes a branch history register 22, an index combining circuit 23, a branch prediction table part 24, a multiplexer 25 and a branch prediction control part 26.

The branch history register 22 holds a history of hit/miss of branch prediction in a time sequence manner.

FIG. 8 shows one example of a data configuration of the branch history register shown in FIG. 7.

The branch history register 22 is configured by a predetermined number of bit rows.

Each bit of a bit row corresponds to a past branch prediction. Each bit of the branch history register 22 stores a value corresponding to a respective branch prediction.

The value corresponding a branch prediction is '1' when the branch is actually made, but '0' when the branch is not actually made.

Bit rows held in the branch history register 22 are provided to the index combining circuit 23.

The index combining circuit 23 combines a program count value from the execution control part 122 (shown in FIG. 2) with a branch history value from the branch history register 22. The branch prediction table part 24 is referred to according to a combining result of the index combining circuit 23.

The branch prediction table part 24 includes n branch prediction tables 24-1 through 24-n. Any of the branch prediction tables 24-1 through 24-n is selected according to the program count value.

Branch prediction data is selected from the thus-selected branch prediction table 24-x according to the value of the branch history register 22.

Figure 9:
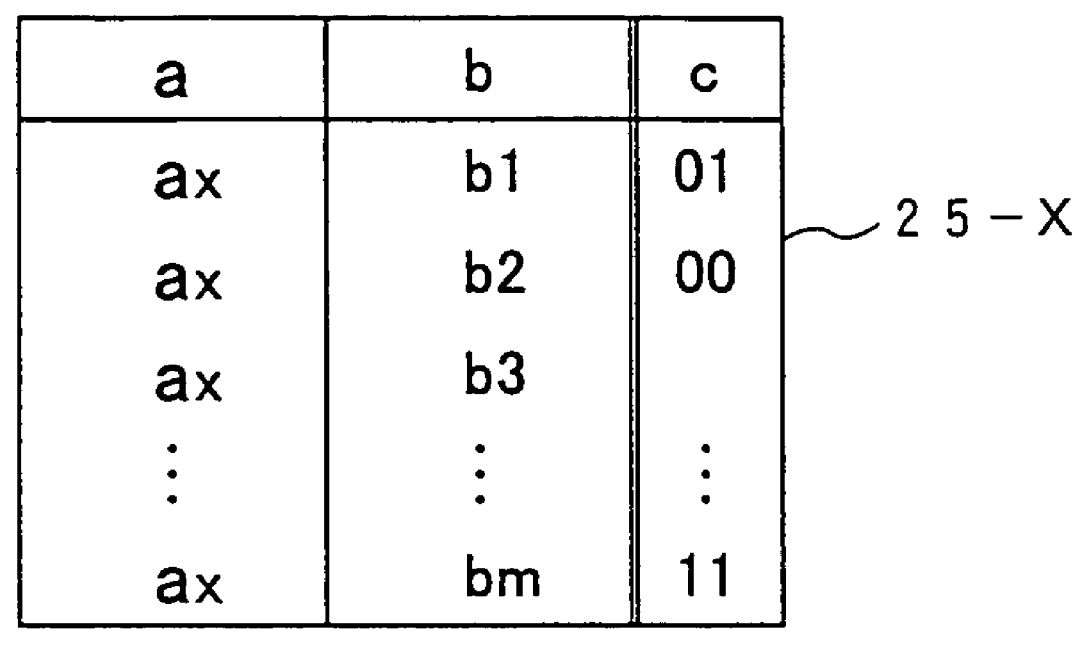

FIG. 9 shows one example of a data configuration of the branch prediction table 24-x.

The branch prediction table 24-x has addresses each being a combination of a program count value ax from the execution control part 122 and a branch history value bm from the branch history register 22, and branch prediction data c is stored according to the addresses.

The branch prediction data c is data of 2 bits, and can indicate the following 4 branch prediction states:

'00' indicates an SNT (Strongly Not Taken) state;
'01' indicates a WNT (Weakly Not Taken) state;
'10' indicates a WT (Weakly Taken) state; and
'11' indicates a ST (Strongly Taken) state.

The SNT state is a state in which a probability of not branching is large, that is, when a branch instruction is executed, because it hardly results in a branch at the past, it is predicted that it will not result in a branch at the next time either;

the WNT state is a state in which the probability of not branching is small, that is, when a branch instruction is executed, it is predicted that it will result in a branch a little, but mostly will not result in the branch;

the WT state is a state in which a probability of branching is small, that is, when a branch instruction is executed, it is predicted that it will not result in a branch a little, but mostly will result in the branch; and the ST state is a state in which the probability of branching is large, that is, it is predicted that it will result in a branch in almost all the cases.

From the branch prediction table part 24, the branch prediction data c is read according to the address provided by the index combining circuit 23. The branch prediction data c read out from the branch prediction table part 24 is provided to the execution control part 122. The execution control part 122 speculatively executes branch instructions according to the branch prediction data c.

FIG. 10 illustrates one example of state transition operations of branch prediction performed by the above-described arithmetic and logic unit in the related art. In the figure, N (Not Taken) indicates a condition in which the branch instruction does not result in a branch, while T (Taken) indicates a condition in which the branch instruction results in a branch.

In FIG. 10, when a branch instruction is executed in the SNT (00) state, a result thereof is reflected in the branch history value. When the branch prediction makes a hit (N), the state remains in the SNT (00). However, when the branch prediction makes a miss (T), the state changes into the WNT (01).

When a branch instruction is executed in the WNT (01) state, a result thereof is reflected in the branch history value. When the branch prediction makes a hit (N), the state changes into the SNT (00). However, when the branch prediction makes a miss (T), the state changes into the WT (10).

When a branch instruction is executed in the WT (10) state, a result thereof is reflected in the branch history value. When the branch prediction makes a hit (T), the state changes into the ST (11). However, when the branch prediction makes a miss (N), the state changes into the WNT (01).

When a branch instruction is executed in the ST (11) state, a result thereof is reflected in the branch history value. When the branch prediction makes a hit (T), the state remains in the ST (11). However, when the branch prediction makes a miss (N), the state changes into the WT (10).

The result of the state transition performed as described above is used for subsequent branch prediction.

Thus, the branch prediction data c according to the branch prediction state is output.

Further, by switching the branch prediction table among those 24-1 through 24-n according to the program count value, it is possible to perform branch prediction control according to the program position.

However, in such a branch prediction method in the related art, because branch prediction data is determined according to a branch history, it is not possible to perform precise branch predictions unless a sufficient number of branch prediction hit/miss results are stored as a branch history.

SUMMARY OF THE INVENTION

The present invention has been devised in consideration of the above-described problems, and an object of the present invention is to provide an arithmetic and logic unit, a branch prediction method, and an information processing apparatus by which it is possible to perform a precise branch prediction and to improve a branch prediction accuracy.

According to the present invention, a branch prediction is performed in response to a branch instruction;

a transition probability of branch prediction is updated according to whether a branch is actually made or not;

it is detected that a process is switched; and the branch prediction information is initialized when it is detected that the process is switched.

Thereby, when a process is switched, a branch prediction is prevented from being performed according to branch prediction data of a past process. Thereby, it is possible to reduce misses of branch prediction.

Further, initialization may be performed based on prediction information given to the branch instruction.

Thereby, it is possible to perform a branch prediction according to prediction information previously given to a branch instruction. Accordingly, it is possible to improve a probability that branch prediction makes a hit.

Further, initialization may be performed according to a branch destination of the branch instruction.

Thereby, it is possible to change strength of prediction at a time of initialization, and to perform an optimum prediction. Accordingly, it is possible to improve a probability that branch prediction makes a hit.

Thus, according to the present invention, by properly initializing a branch prediction table according to an address at which a branch instruction exists and a branch destination address, it is possible to improve an accuracy of branch prediction.

According to another aspect of the present invention, branch prediction data indicates a state of branch prediction is determined according to whether a branch is actually made or not;

a branch prediction is performed according to the branch prediction data; and the branch prediction data is corrected according to whether a branch is actually made or not.

Thereby, it is possible to obtain optimum branch prediction data according to whether a branch is actually made or not, and, thereby, to perform a precise branch prediction.

Further, when the branch prediction data is corrected, a predetermined branch prediction changing table may be selected from a plurality of branch prediction changing tables previously weighted according to a history of whether or not branches are actually made, branch prediction updating data corresponding to the branch prediction data may be read from the selected branch prediction updating table, and the read branch prediction updating data may be determined as a new branch prediction data.

Further, when the branch prediction data is corrected, branch prediction data corresponding to a branch instruction may be obtained from a branch prediction table;

branch prediction supplementary data may be obtained according to a history of whether or not branches are actually made;

a branch prediction updating table corresponding to the branch prediction supplementary data may be selected from a plurality of branch prediction updating tables storing branch prediction data having different weights in transition directions of the branch prediction data, and branch prediction updating data corresponding to the branch prediction data may be output; and the branch prediction table may be updated according to the branch prediction updating data from the branch prediction updating table.

Thereby, it is possible to weight in transition directions of branch prediction according to history of branch prediction, and, thereby, to perform a precise branch prediction rapidly.

Further, when the branch prediction data is corrected, weightings in transition directions of the branch prediction data may be controlled according to preset profile information.

Thereby, it is possible to control correction of the branch prediction data according to the profile information, thereby, to fix predetermined branch prediction, and to perform branch prediction according to a branch instruction. Accordingly, it is possible to reduce misses of branch prediction.

Thus, according to the other aspect of the present invention, by preparing tables of weightings for branch prediction, and to properly using these different tables, it is possible to improve an accuracy of branch prediction.

Other objects and further features of the present invention will become more apparent from the following detailed description when read in conjunction with the accompanying drawings.

BRIEF DESCRIPTION OF THE DRAWINGS

FIG. 5 shows one example of a data configuration of a branch history register shown in FIG. 4;

FIG. 8 shows one example of a data configuration of a branch history register shown in FIG. 7;

FIG. 9 shows one example of a data configuration of a branch prediction table part shown in FIG. 7;

FIG. 18 shows one example of a data configuration of a branch prediction supplementary table part shown in FIG. 17;

FIG. 19 shows one example of a data configuration of a branch direction transition table part shown in FIG. 17;

DETAILED DESCRIPTION OF THE PREFERRED EMBODIMENTS

Figure 11:
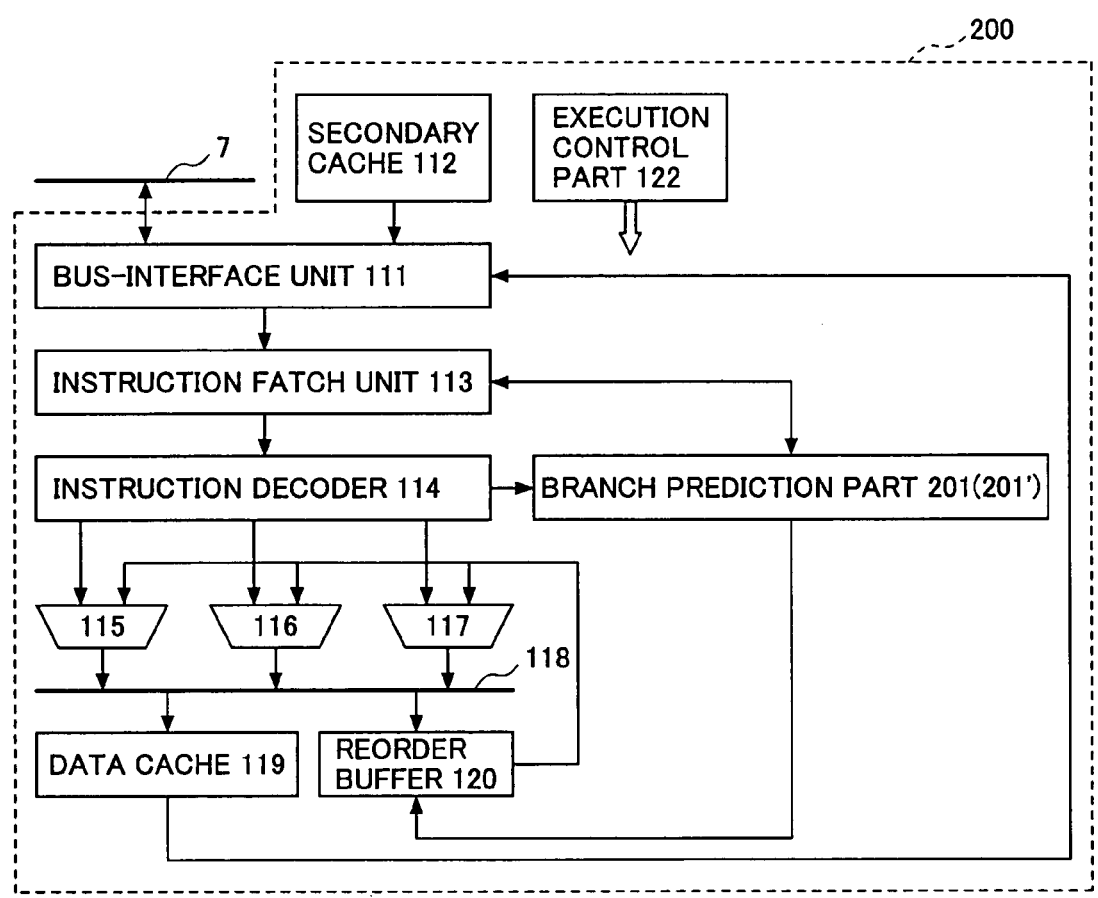
FIG. 11 shows a block diagram of each of first and second embodiments of the present invention.

FIG. 11 shows a block diagram of an arithmetic and logic unit in each of first and second embodiments of the present invention.

Figure 2:
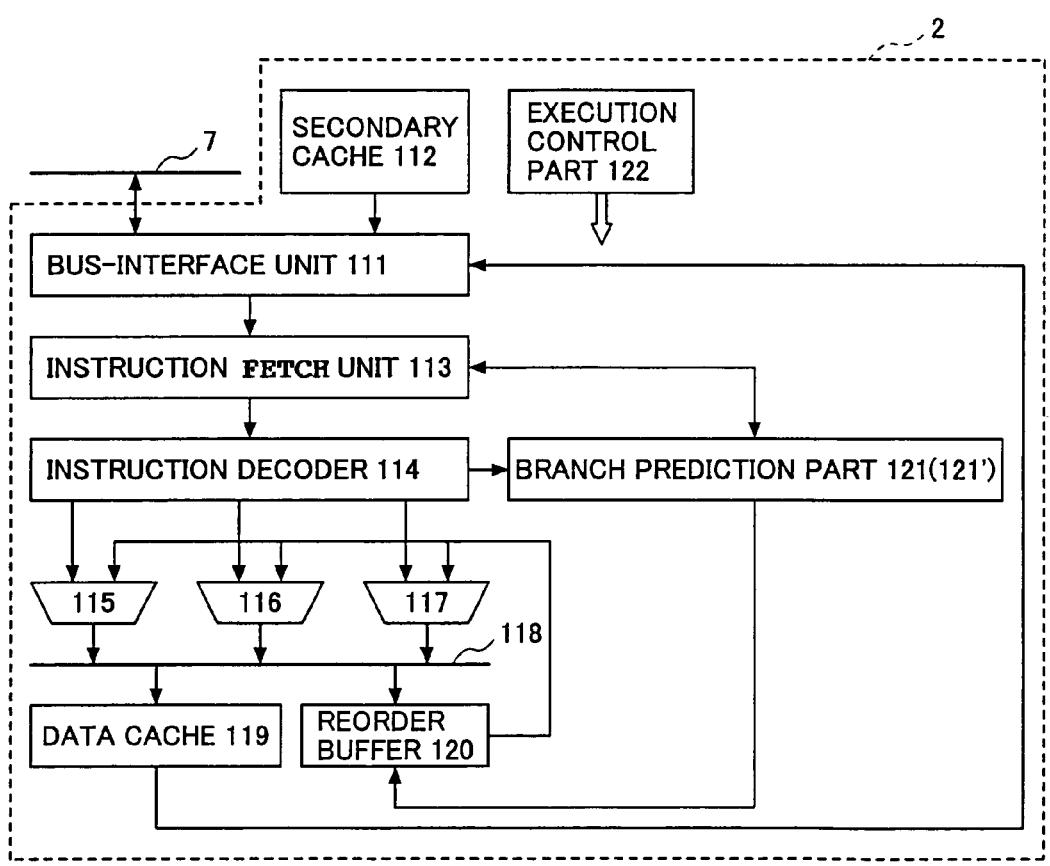
FIG. 2 shows a block diagram of an arithmetic and logic unit shown in FIG. 1.
Figure 3:
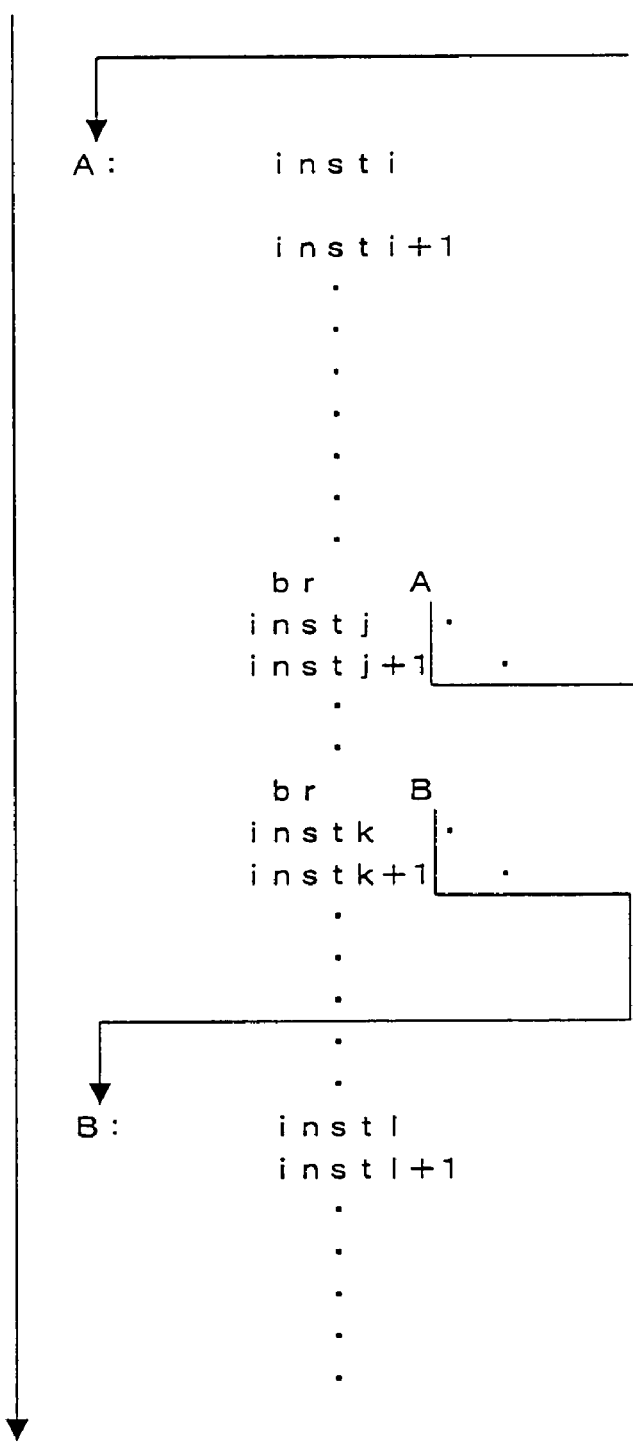
FIG. 3 illustrates branch instruction operations.

In FIG. 11, the same reference numerals are given to the same parts/components as those of FIG. 2, and description thereof is omitted.

Figure 1:
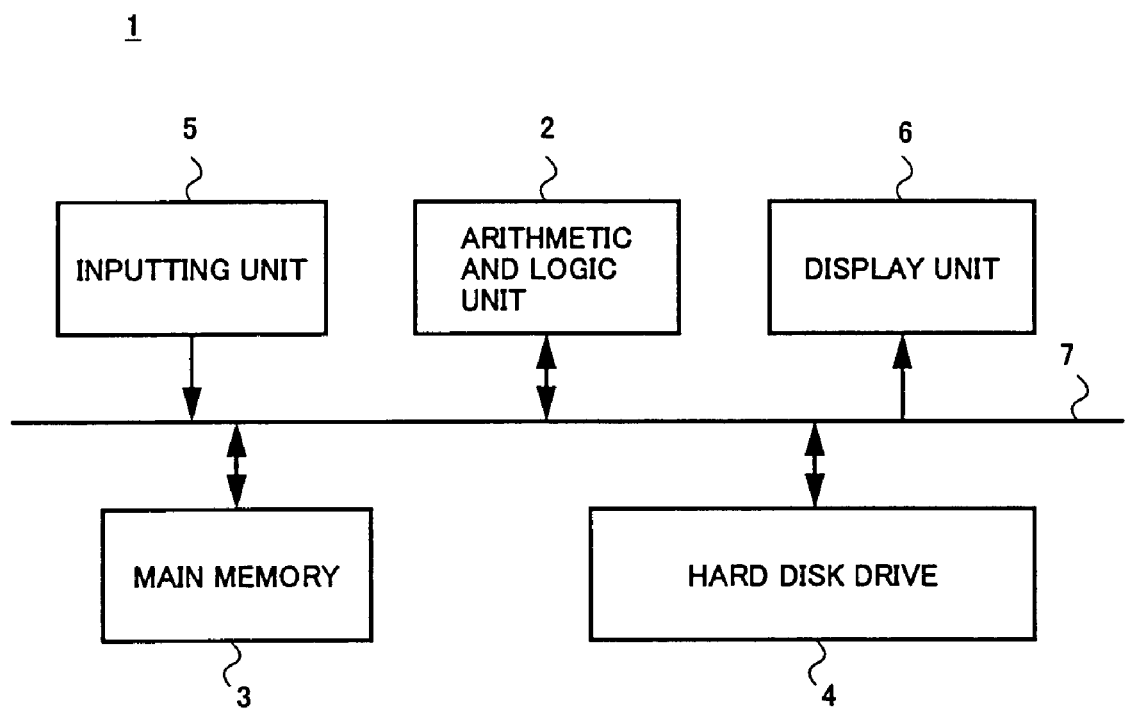
FIG. 1 shows a block diagram of one example of an information processing apparatus in the related art.

Further, the entire configuration of an information processing apparatus in each of the first and second embodiments of the present invention is the same as that shown in FIG. 1 except that the arithmetic and logic unit 2 is replaced by the arithmetic and logic unit 200 shown in FIG. 11, and description thereof is omitted.

The arithmetic and logic unit 200 in each of the first and second embodiments is different from the arithmetic and logic unit 2 shown in FIG. 2 in the configuration of a branch prediction part 201.

Figure 12:
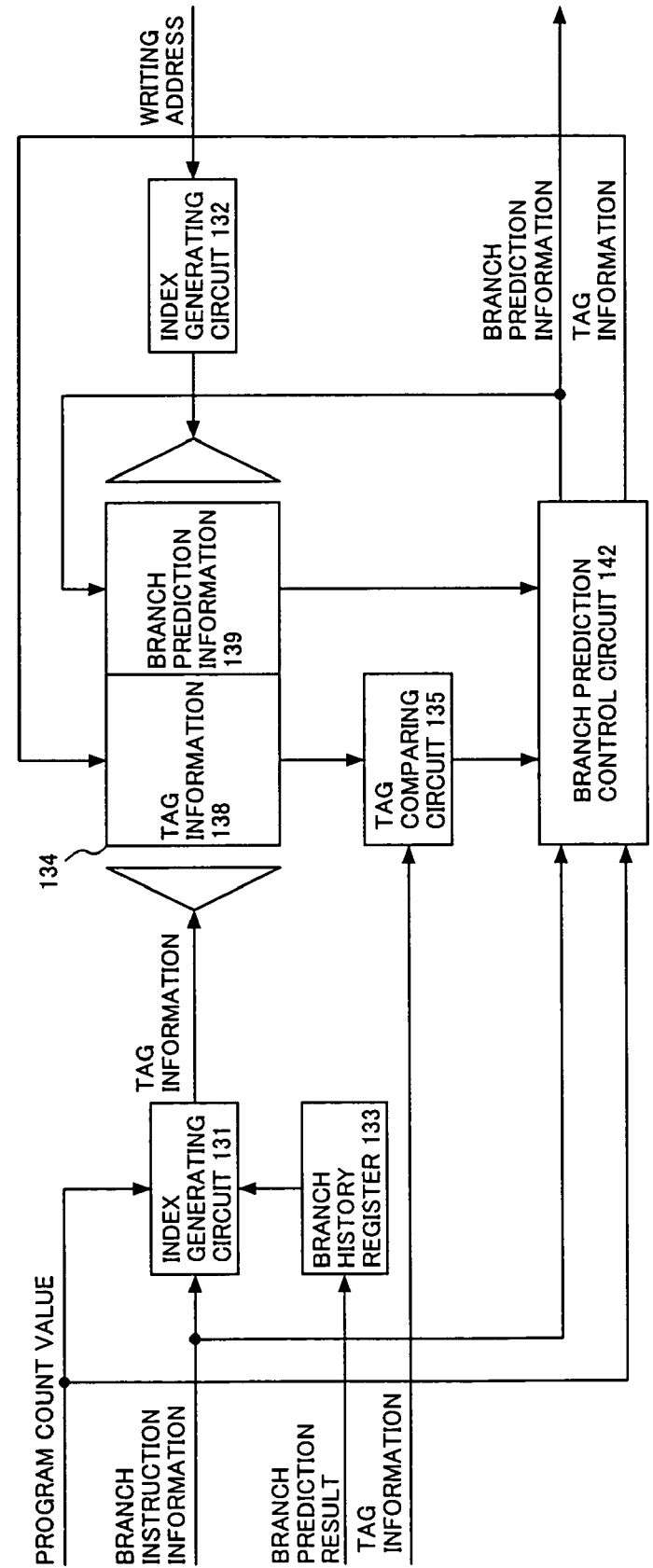
FIG. 12 shows a block diagram of a branch prediction control part shown in FIG. 11 in the first embodiment of the present invention.

FIG. 12 shows a block diagram of a branch prediction part 201 in the first embodiment of the present invention.

Figure 4:
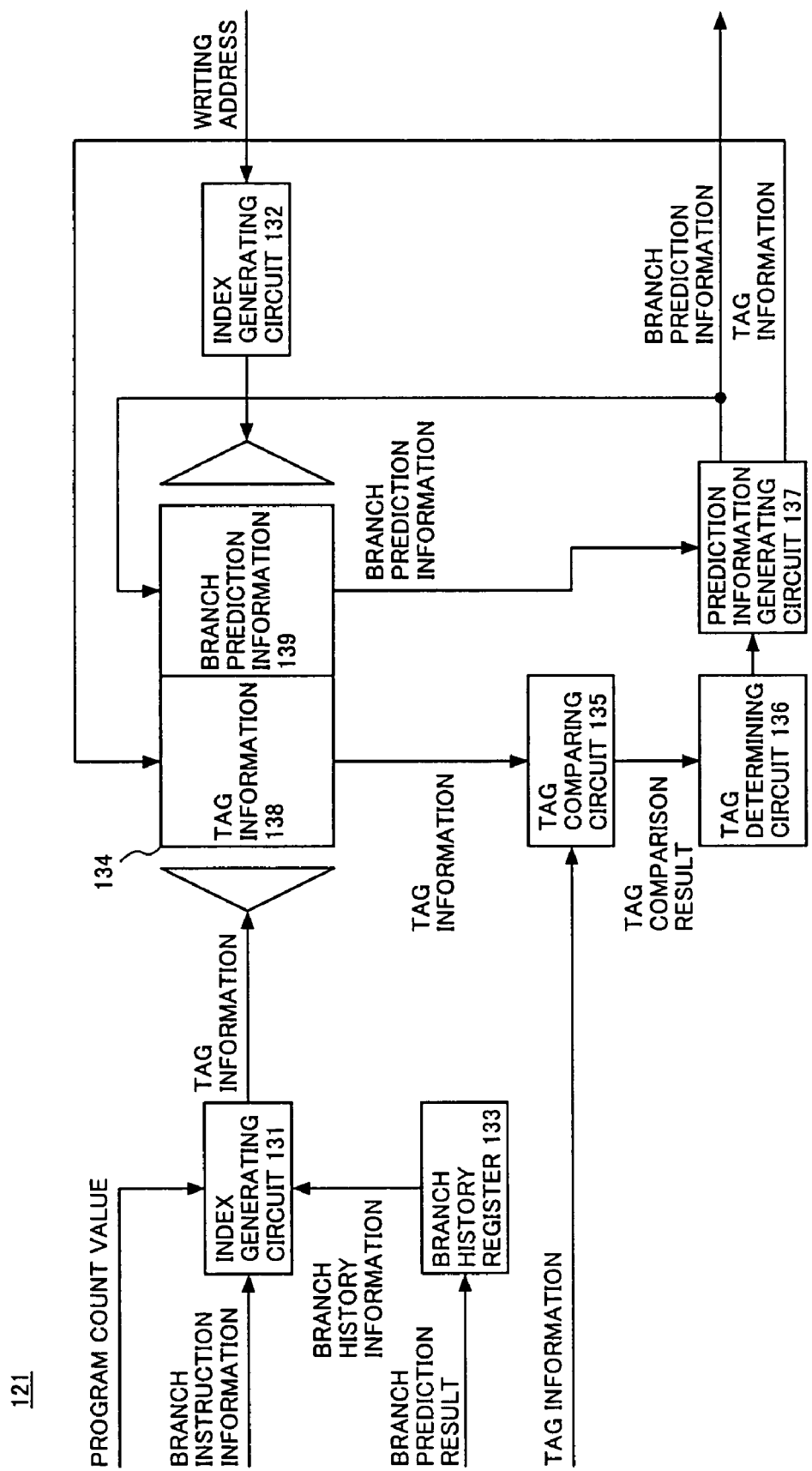
FIG. 4 shows one example of a branch prediction part in the related art shown in FIG. 2.
Figure 6:
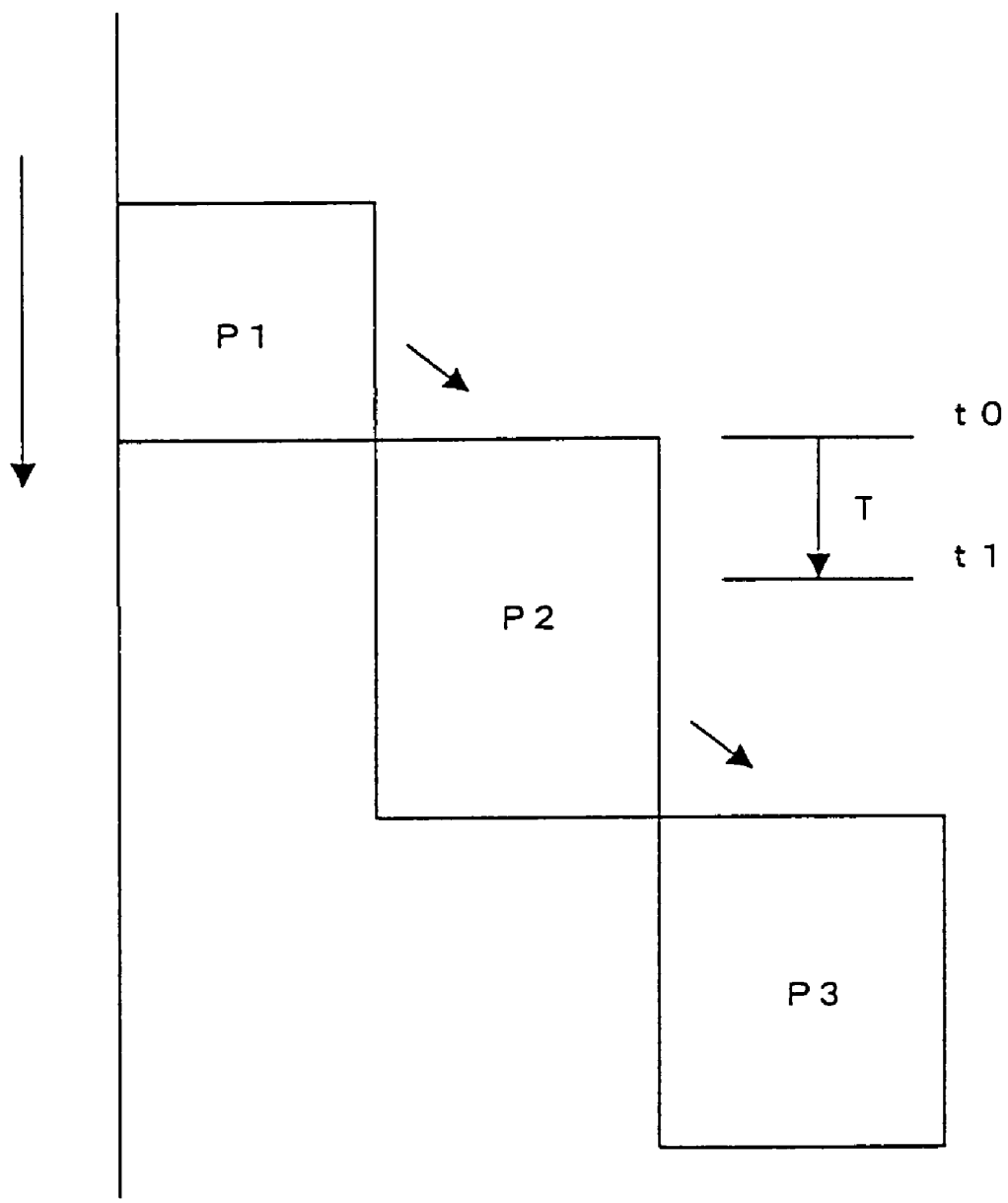
FIG. 6 illustrates program switching operations.

In FIG. 12, the same reference numerals are given to the parts/components same as those shown in FIG. 4, and description thereof is omitted.

The branch prediction part 141 has a branch prediction control circuit 142 instead of the tag determining part 136 and prediction information generating circuit 137.

The branch prediction control circuit 142 detects switching of a program according to the program count address, and, when the program is switched, initializes the branch prediction into a preset, predetermined branch prediction information regardless of the branch prediction information 139 from the branch prediction information storing part 134.

Figure 13:
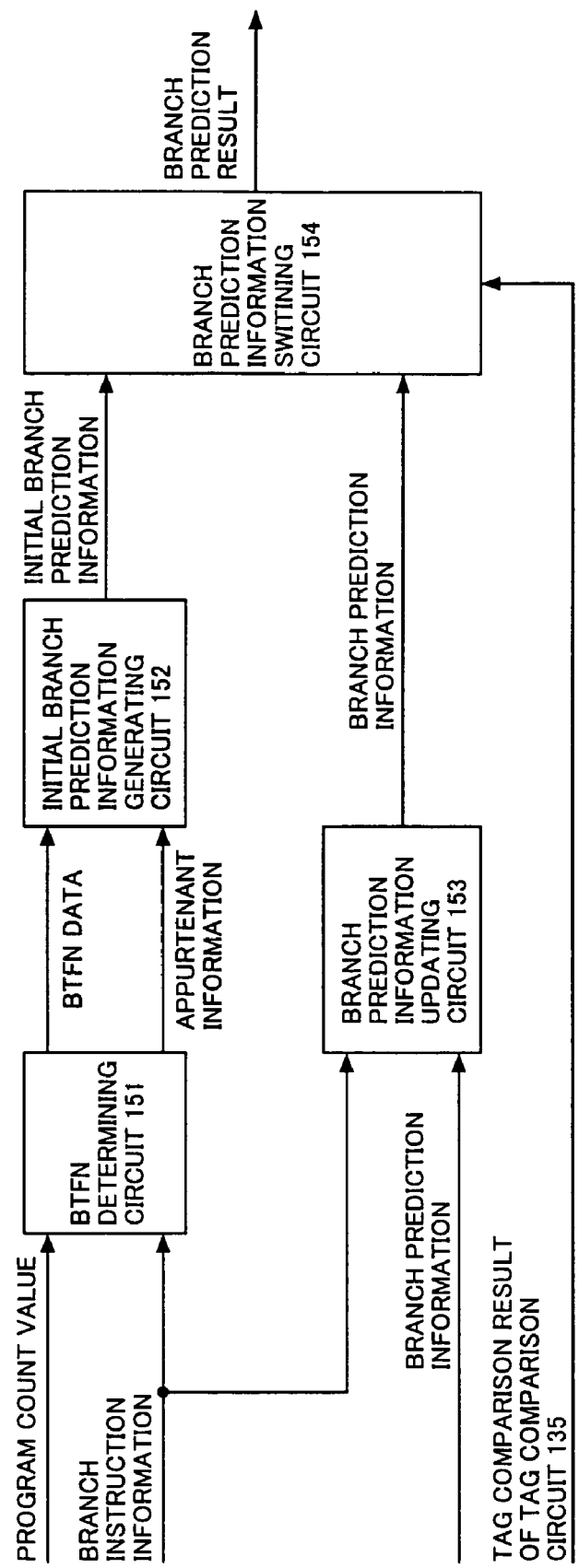
FIG. 13 shows a block diagram of a branch prediction control circuit shown in FIG. 12.

FIG. 13 shows a block diagram of the branch prediction control part 142 in the first embodiment of the present invention.

The branch prediction control part 142 includes a BTFN (Backward Taken/Forward Not taken) determining circuit 151, an initial branch prediction information generating circuit 152, a branch prediction information updating circuit 153, and a branch prediction information switching circuit 154.

The BTFN determining circuit 151 compares the program count value with the branch destination address, and determines whether the branch prediction direction is BT "Backward Taken" or FN "Forward Not taken".

The determination result of the BTFN determining circuit 151 is provided to the initial branch prediction information generating circuit 152.

According to the determination result from the BTFN determining circuit 151, the initial prediction information generating circuit 152 generates initial branch prediction information.

The branch prediction information updating circuit 153 generates branch prediction information to be used for updating.

The initial branch prediction information generated by the initial branch prediction information generating circuit 152 and the branch prediction information generated by the branch prediction information updating circuit 153 are provided to the branch prediction information switching circuit 154.

The branch prediction switching circuit 154 selects the initial branch prediction information generated by the initial branch prediction information generating circuit 152 or the branch prediction information generated by the branch prediction information updating circuit 153 according to the comparison result of the tag comparing circuit 135, and outputs the thus-selected information.

The BTFN determining circuit 151 will now be described in detail.

Figure 14:
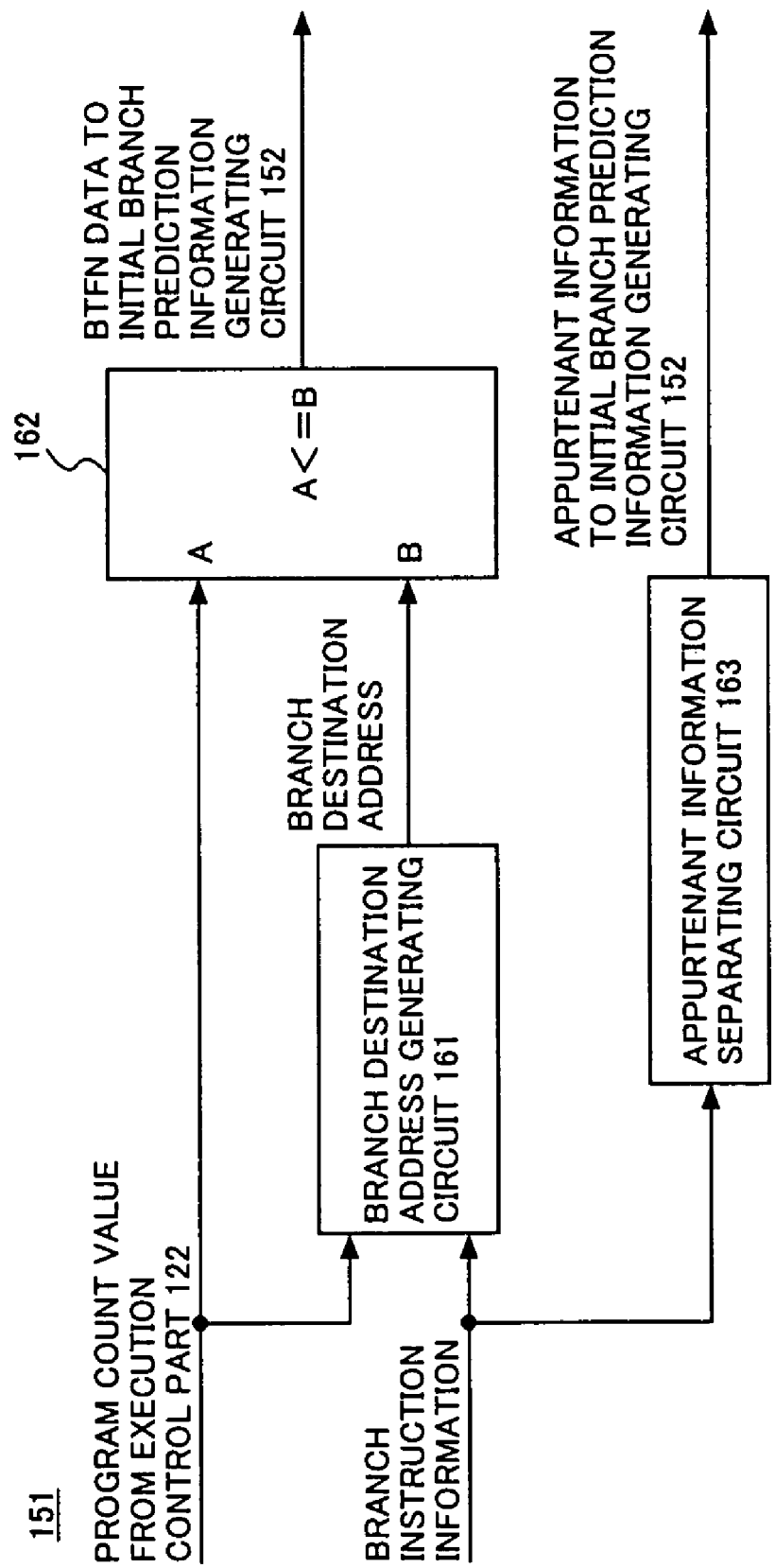
FIG. 14 shows a block diagram of a BTFN determining circuit shown in FIG. 13.

FIG. 14 shows a block diagram of the BTFN determining circuit 151.

The BTFN determining circuit 151 includes a branch destination address generating circuit 161, a comparing circuit 162 and an appurtenant information separating circuit 163.

The program count value is provided to the branch destination address generating circuit 161 from a program counter of the execution control part 122, and, also, the branch instruction information is provided to the branch destination address generating circuit 161 from the instruction fetch unit 113 and instruction decoder 114.

The branch destination address generating circuit 161 generates a branch destination instruction address from the given program count value and branch instruction information.

The branch destination instruction address generated by the branch destination address generating circuit 161 is provided to the comparing circuit 162.

The program count value is provided also to the comparing circuit 162 from the program counter, and, also, the branch destination instruction address is provide to the comparing circuit 162 from the branch destination address generating circuit 161.

The comparing circuit 162 compares the program count value with the branch destination instruction address, and, outputs branch direction information according to the comparison result.

Specifically, when the branch destination instruction address is smaller than the program count value (address), the comparing circuit 162 outputs branch direction information BT (Backward Taken). When the branch destination instruction address is equal to or larger than the program count value, the comparing circuit 162 outputs branch direction information FN (Forward Not taken).

The branch direction information BT indicates backward referring, and the branch direction information FN indicates forward referring.

As the BT, the branch prediction information '10' corresponding to the WT is output. As the FN, the branch prediction information '01' corresponding to the WNT is output.

The output of the comparing circuit 162 is provided to the initial branch prediction information generating circuit 152.

The branch instruction information is also provided to the appurtenant information separating circuit 163.

The appurtenant information separating circuit 163 separates branch direction information from the branch instruction information. The branch direction information separated by the appurtenant information separating circuit 163 is provided to the initial branch prediction information generating circuit 152.

The initial branch prediction information generating circuit 152 will now be described in detail.

Figure 15:
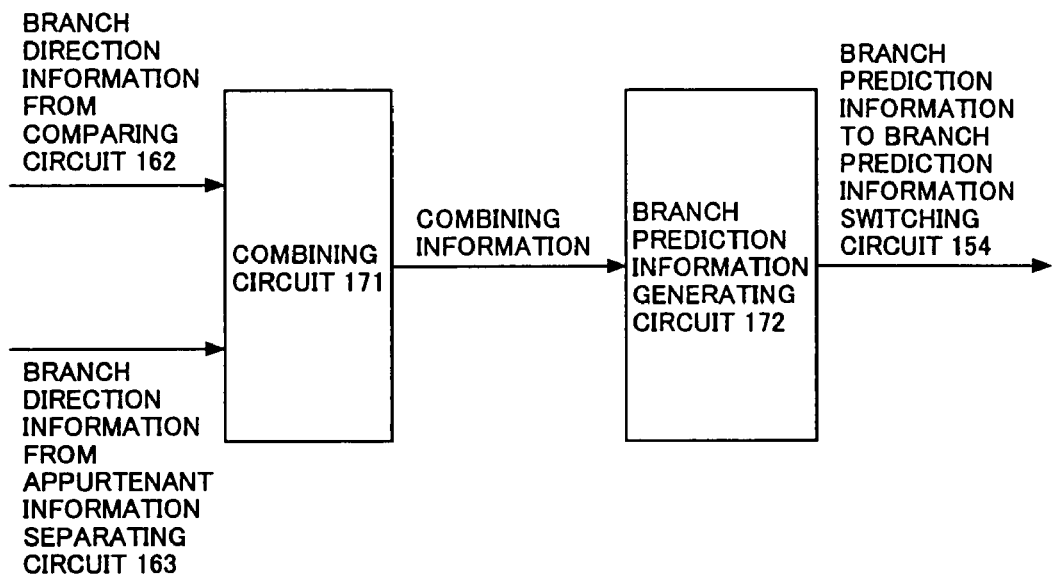
FIG. 15 shows a block diagram of an initial branch prediction information switching circuit shown in FIG. 13.

FIG. 15 shows a block diagram of the initial branch prediction information generating circuit 152.

The initial branch prediction information generating circuit 152 includes a combining circuit 171, and a branch prediction information generating circuit 172.

The branch direction information is provided to the combining circuit 171 from the comparing circuit 162 and appurtenant information separating circuit 163.

When the branch direction information is provided to the combining circuit 171 from the appurtenant information separating circuit 163, the combining circuit 171 outputs the thus-provided branch direction information as it is. However, when no branch direction information is provided to the combining circuit 171 from the appurtenant information separating circuit 163, the combining circuit 171 outputs the branch direction information provided from the comparing circuit 162.

The output of the combining circuit 171 is provided to the branch prediction information generating circuit 172.

The branch prediction information generating circuit 172 generates branch prediction information according to the branch direction information from the combining circuit 171.

The output of the initial branch information generating circuit 152 is provided to the branch prediction information switching circuit 154.

The branch prediction information switching circuit 154 will now be described in detail.

Figure 16:
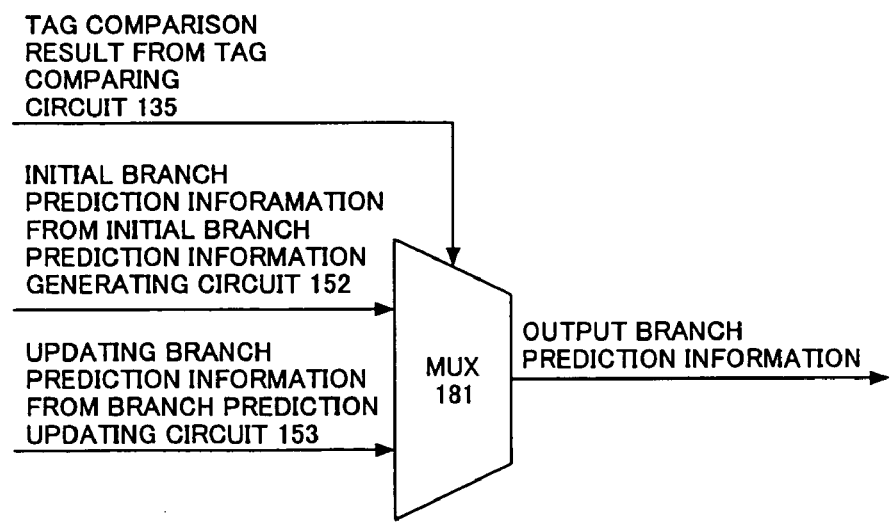
FIG. 16 shows a block diagram of a branch prediction data switching circuit shown in FIG. 13.

FIG. 16 shows a block diagram of the branch prediction information switching circuit 154.

The branch prediction information switching circuit 154 includes a multiplexer 181.

The branch prediction information is provided to the multiplexer 181 from the initial branch prediction information generating circuit 152 and branch prediction information updating circuit 153, and, also, the comparison result is supplied to the multiplexer 181 from the tag comparing circuit 135.

When the comparison result from the tag comparing circuit 135 is information indicating switching of process, the branch prediction information switching circuit selects the branch prediction information from the initial branch prediction information generating circuit 152. When the comparison result from the tag comparing circuit 135 is information indicating a state in which no change of process occurs, the branch prediction information switching circuit selects the branch prediction information from the branch prediction information updating circuit 153.

The branch prediction information from the branch prediction information switching circuit 154 is provided to the execution control circuit 122 which then performs a branch based on the branch prediction information provided from the branch prediction information switching circuit 154.

When detecting a branch instruction, the tag comparing circuit 135 searches for the entry of the branch prediction information storage part (table) 134 using information of the program count value, branch history and so forth.

The tag comparing circuit 135 then examines the tag information 138 of the thus-searched-for entry of the branch prediction information storage part 134, obtains therefrom past process information which was used in producing the prediction information, and compares the thus-obtained process information with the process information including the current branch instruction.

As the tag information, context addresses are used. However, it is not necessary to be limited thereto. Any other information by which branch instructions are effectively identified may be used for the same purpose. For example, virtual addresses may be used.

When the comparison result is that the context addresses coincide with one another, the previously collected branch prediction information is used. When the comparison result is that the context addresses do not coincide with one another, the branch prediction information is set to the preset initial value.

According to the comparison result of the tag comparison circuit 135, it can be detected whether or not the same process is processed and the branch prediction information storing part 134 is used therefor.

When the branch prediction control circuit 142 detects that the same process is processed and the branch prediction storage part 134 is used therefore, branch prediction is performed based on the branch prediction information obtained from the branch prediction storage part 134.

When it is determined from the comparison result of the tag comparison circuit 135 that the different process is processed, the branch prediction information is set to the preset initial value.

First, the initial branch prediction information generating circuit 152 calculates the branch destination address when no prediction bit is specified in the branch instruction.

As a result of calculation of the branch destination address, when the calculated branch destination instruction address is smaller than the program count value (address) of the branch instruction, the initial branch prediction information generating circuit 152 outputs the branch direction information BT (Backward Taken).

When the branch destination instruction address is equal to or larger than the program count value of the branch instruction, the initial branch prediction information generating circuit 152 predicts the branch direction information to be FN (Forward Not taken).

The overall operation of the branch prediction part 121 will now be described in detail.

When a branch instruction is detected, the entry of the branch prediction table of the branch prediction information storing part 134 is searched for from the program count value and branch history information.

Then, the tag information 138 of the thus-obtained entry of the branch prediction table of the branch prediction storing part 134 is examined. Then, the past process information which was used in producing the prediction information is obtained therefrom.

As the tag information, any information may be used as long as it is possible to identify branch instructions effectively thereby, such as a context address or a virtual address may be used.

Then, the thus-obtained process information is compared with the process information including the currently executed branch instruction, and it is determined whether they coincide with one another.

As a result of the comparison of the process information, when both the process information coincides with one another, it can be determined that the processes coincide with one another. Accordingly, branch prediction is performed using the previously collected branch prediction information.

When both the process information does not coincide with one another, it can be determined that the processes do not coincide with one another. Accordingly, the branch prediction information is initialized.

Then, when it is recognized from the comparison result of the tag information 138 that the processes coincide with one another, the branch prediction information 139 currently stored in the branch prediction table of the branch prediction information storage part 134 is used, and the direction of branch prediction, that is, whether a branch is performed or not, is determined.

When it is recognized from the comparison result of the tag information 138 that the processes do not coincide with one another, it is determined whether or not prediction information is specified in the branch instruction. When prediction information is specified in the branch instruction, the branch prediction table of the branch prediction storage part 134 is updated according to the specified branch information.

The above-mentioned branch information includes one bit of data, for example.

When this branch information is '0', it indicates a direction of not branching. When the branch information is '1', it indicates a direction of branching.

When the branch information is '1', the branch prediction information of the branch prediction table is initialized to ST (Strongly Taken). When the branch information is '0', the branch prediction information of the branch prediction table is initialized to SNT (Strongly Not Taken).

When no branch information is specified in the branch instruction, the target address of the branch destination is calculated based on the tag information.

Then, the thus-calculated target address is compared with the program count value (address) of the branch instruction. The branch prediction information is initialized according to the comparison result.

When the target address is smaller than the program count address of the branch instruction, the branch direction is predicted as BT (Backward Taken). When the target address is equal to or larger than the program count address of the branch instruction, the branch direction is predicted as FN (Forward Not taken).

When the branch direction is predicted as BT, the branch prediction information of the branch prediction table is initialized to WT (Weakly Taken). When the branch direction is predicted as FN, the branch prediction information of the branch prediction table is initialized to WNT (Weakly Not Taken).

Thus, the branch prediction information is initialized when the process is switched.

As a result of the branch prediction information being thus initialized, it is possible to perform branch prediction without depending on branch prediction information of a different process. Accordingly, it is possible to prevent useless state transition of branch prediction.

Figure 7:
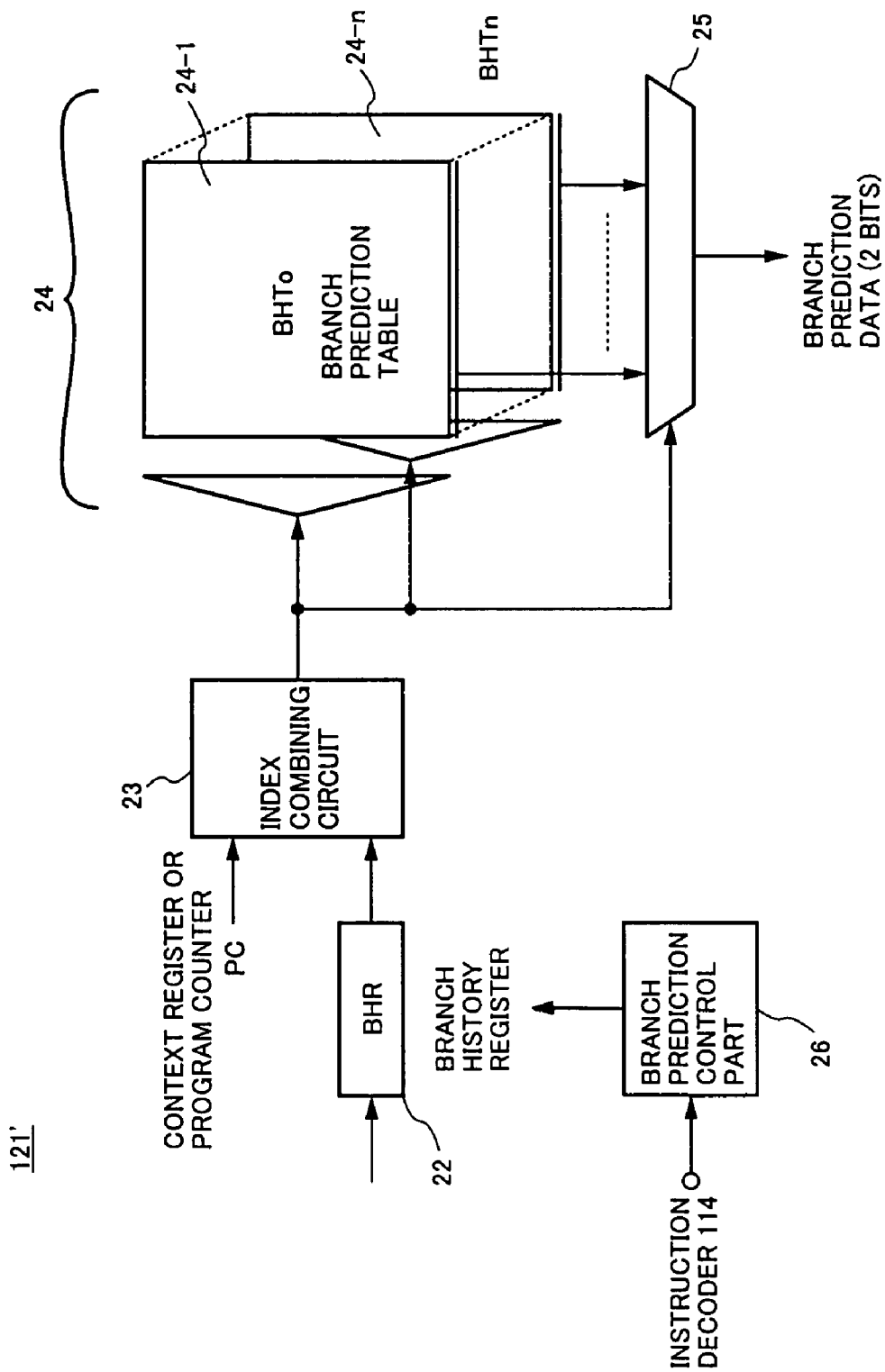
FIG. 7 shows a block diagram of another example of the branch prediction part shown in FIG. 2.
Figure 10:
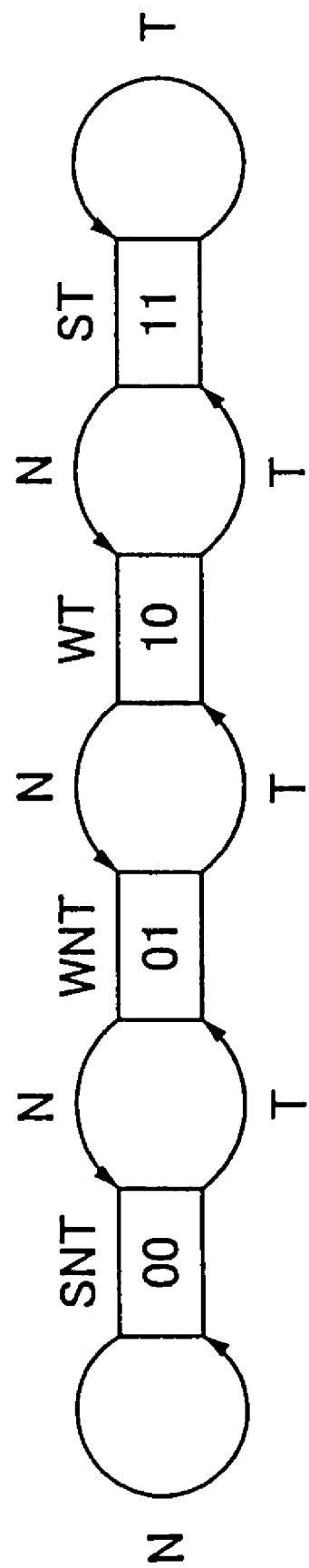
FIG. 10 illustrates operations of the arithmetic and logic unit shown in FIG. 2.
Figure 17:
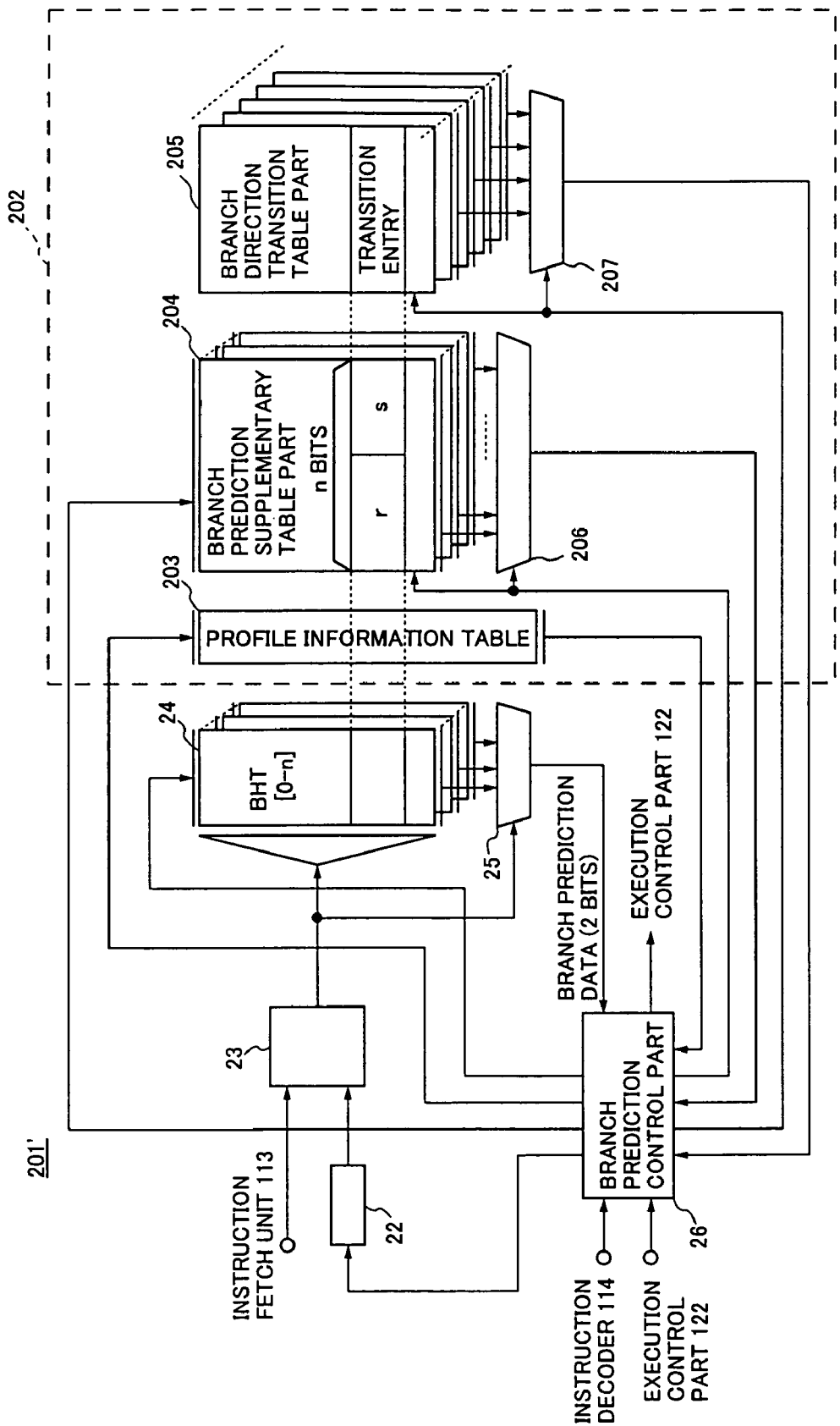
FIG. 17 shows a block diagram of a branch prediction part shown in FIG. 11 in the second embodiment of the present invention.

FIG. 17 shows a block diagram of the branch prediction part 201 shown in FIG. 11 in the second embodiment of the present invention (it will be referred to as the branch prediction part 201', hereinafter, in order to distinguish it from the part 201 shown in FIG. 12). In FIG. 17, the same reference numerals are given to the same parts/components as those of FIG. 7, and description thereof is omitted.

The branch prediction part 201' includes a branch history register 22, an index combining circuit 23, a branch prediction table part 24, a multiplexer 25, a branch prediction control part 26, and a branch prediction correcting circuit 202.

The branch prediction correcting circuit 202 includes a profile information table 203, a branch prediction supplementary table part 204, a branch direction transition table part 205, a multiplexers 206 and 207.

The profile information table 203 stores profile information. The profile information is information for controlling updating of the information stored in the branch prediction supplementary table part 203.

The branch prediction supplementary table part 204 stores branch prediction supplementary data.

When a corresponding bit of the profile information is set to '1', the branch prediction supplementary data outputted from the branch prediction supplementary table 204 is fixed. When the corresponding bit of the profile information is set to '0', the branch prediction supplementary data from the branch prediction supplementary table 204 can be updated.

The profile information of the profile information table 203 is controlled by the branch prediction control part 26.

FIG. 18 shows one example of a data configuration of the branch prediction supplementary data stored in the branch prediction supplementary table part 204.

The branch prediction supplementary table part 204 includes m branch prediction supplementary tables 204-1 through 204-m.

A branch prediction supplementary table 204-x selected from the branch prediction supplementary tables 204-1 through 204-m according to the program count value includes bit rows each including n bits. Each bit row includes a two bit fields, i.e., an r-field and an s-field.

The r-field stores a history of taken/not taken of past branch results. The s-field stores a value for selecting from the branch direction transition table part 205.

The branch prediction supplementary table part 204 outputs the data (r, s) according to an entry specified by the branch prediction control part 26.

The output from the branch prediction supplementary table 204 is provided to the branch prediction control part 26 via the multiplexer 206.

The branch direction transition table part 205 includes m branch direction transition tables 205-1 through 205-m, where 2n=m.

The branch direction transition tables 205-1 through 205-m output branch prediction update data using branch prediction data from the branch prediction control part 26 as entries.

Similar to the branch prediction data, branch prediction update data is one of '00', '01', '10' and '11'.

Similar to the branch prediction data, the branch prediction update data '00', '01', indicates an SNT (Strongly Not Taken) state;

the branch prediction update data '01' indicates a WNT (Weakly Not Taken) state;

the branch prediction update data '10' indicates a WT (Weakly Taken) state; and the branch prediction update data '11' indicates a ST (Strongly Taken) state.

FIG. 19 shows one example of a data configuration of the branch direction transition tables 205-1 through 205-m.

The branch direction transition table 205-x is selected from the m branch direction transition tables 205-1 through 205-m according to the value of s-field.

The selected branch direction transition table 205-x has the branch prediction data '00', '01', '10' and '11' as entries.

A bit row of 4 bits is set for each of the branch prediction data '00', '01', '10' and '11' in the branch direction transition table 205-x.

The first bit thereof corresponds to the branch prediction update data '00', the second bit thereof corresponds to the branch prediction update data '01', the third bit thereof corresponds to the branch prediction update data '10' and the fourth bit thereof corresponds to the branch prediction update data '11'.

The branch prediction update data corresponding to the bit thereof having the bit value '1' is outputted.

For example, it is assumed that the branch direction transition table 205-x is selected from the branch direction transition tables 205-1 through 205-m according to the value of s-field, and the branch prediction data given at this time is '01'.

In FIG. 19, the bit row set for the transition entry '01' is '0010' in the branch direction transition table 205-x. This bit row '0010' has '1' at the third bit thereof. The third bit of the bit row corresponds to the branch prediction update data '10', as shown in the figure. Accordingly, the branch prediction update data '10' is outputted.

Bit patterns of the branch direction transition tables 205-1 through 205-m include a bit pattern by which transition to the SNT state is easy to be made, a bit pattern by which transition to the WNT state or WN state is easy to be made and a bit pattern by which transition to the SN state is easy to be made. By these bit patterns, weightings to transitions is made.

A branch direction transition table is selected from these branch direction transition tables 205-l through 205-m heuristically according to the branch history.

For example, when 'Taken' occurs frequently in the branch history, a branch direction transition table having a low threshold for a direction to the ST state and WT state, and a high threshold for a direction to the SNT state and WNT state is selected.

In contrast to this, when 'Not-Taken' occurs frequently in the branch history, a branch direction transition table having a high threshold for the direction to the ST state and WT state, and a low threshold for the direction to the SNT state and WNT state is selected.

The value of s-field is provided to the multiplexer 207. The multiplexer 207 selects and outputs the output from the branch direction transition table 205-x according to the value of s-field.

The branch prediction update data selected and outputted by the multiplexer 207 is provided to the branch prediction control part 26.

The branch prediction control part 26 updates the corresponding branch prediction data of the branch prediction table part 24 by the branch prediction update data from the multiplexer 207.

The updated branch prediction data is provided to the branch prediction control part 26 via the multiplexer 25 and is used for branch prediction.

The branch prediction control part 26 controls the output value of the branch prediction supplementary table part 204 according to the value of the branch history register 22.

For example, the frequency of occurrences of '0' in the branch history register 22 is larger than a predetermined value, that is, the frequency of occurrences of branch result 'Not Taken' (a branch is not actually made) is large, the value of s-field corresponding to the value of r-field according to the value of the branch history register 22 is output from the branch prediction supplementary table part 204.

According to the thus-output value of s-field, the branch direction transition table 205-x selected in the branch direction transition table part 205 is determined. As a result of the branch direction transition table 205-x being thus controlled, the branch prediction update data selected and outputted from the branch direction transition table part 205 is controlled accordingly.

The branch prediction control part 26 updates the branch prediction data of the branch prediction table part 24 according to the thus-controlled branch prediction update data.

Figure 20:
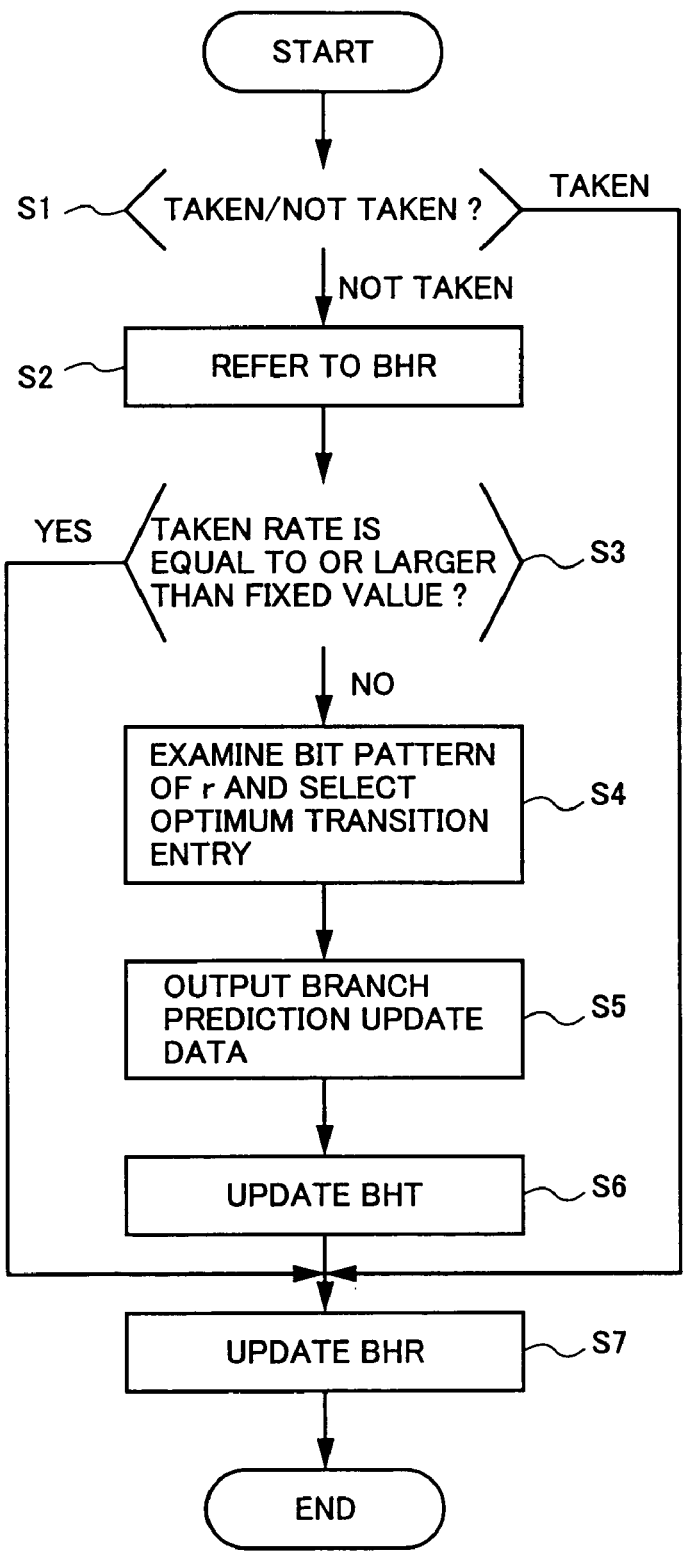
FIG. 20 shows an operation flow chart of a branch prediction part shown in FIG. 17.

FIG. 20 shows an operation flow chart of the above-described branch prediction part 201 in the second embodiment of the present invention.

In a step S1, it is determined whether the branch result provided by the control part 17 is 'Taken' (a branch is actually made) or 'Not Taken' (the branch is not actually made).

When it is determined in the step S1 that the branch result is 'Taken', a step S7 is performed. In the step S7, the branch history register 22 is updated according to the branch result.

When it is determined in the step S1 that the branch result is 'Not Taken', a step S2 is performed.

In the step S2, the branch history register 22 is referred to.

In a step S3, it is determined, from the result of referring to the branch history register 22, whether or not the Taken rate of the branch history (the ratio of the number of occurrences of the results 'Taken' to the total number of the branch results) is equal to or higher than a predetermined value.

The Taken rate is calculated from a ratio the bits "1" of all the bits of the branch history register 22.

In the step S3, it is determined whether or not this ratio is equal to or larger than the predetermined value.

When it is determined in the step S3 that the Taken rate is equal to or larger than the predetermined value, the above-mentioned step S7 is performed, and, thus, the branch history register is updated by the above-mentioned branch result.

When it is determined in the step S3 that the Taken rate is smaller than the predetermined value, a step S4 is performed.

In the step S4, an optimum transition entry is selected.

In the step S4, the branch prediction supplementary table part 204 is referred to according to the bit pattern of the branch history register 24. Thereby, the branch prediction supplementary value (s-field) is obtained therefrom according to this bit pattern (r-field).

Then, the branch direction transition table part 205 is referred to according to the branch prediction supplementary value, and the optimum transition entry is obtained.

In a step S5, the optimum transition entry obtained in the step S4 is output as the above-mentioned branch prediction update data.

In a step S6, the branch prediction update data output in the step S5 is used to update the branch prediction data of the branch prediction data table part 24.

Figure 21:
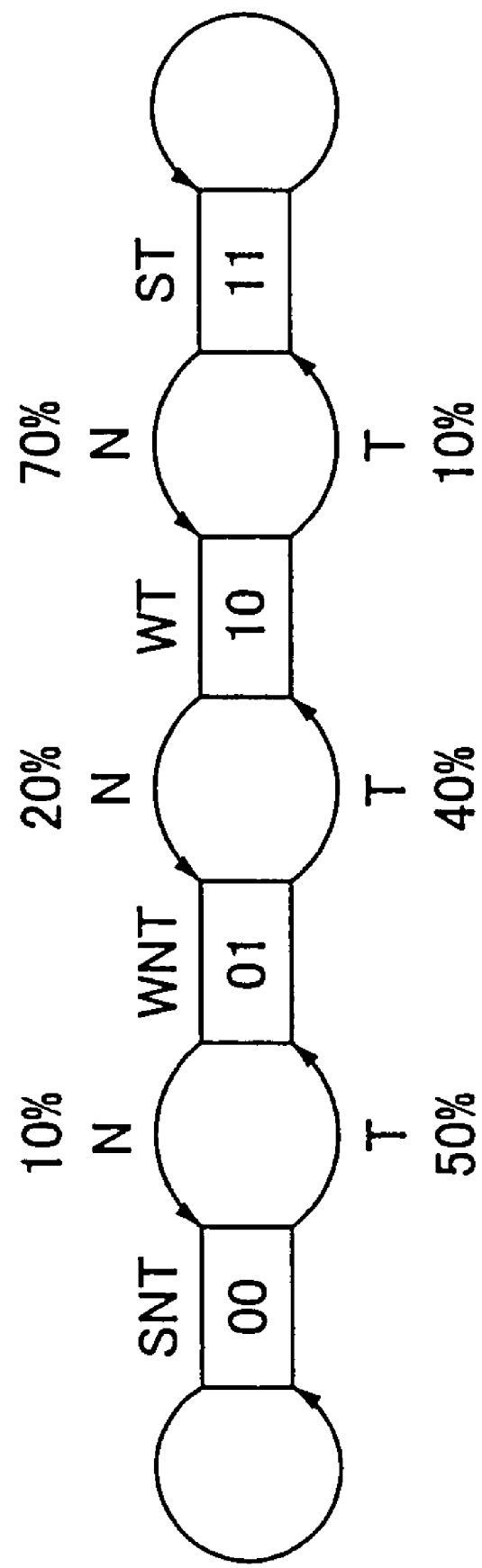
FIG. 21 illustrates operations of the second embodiment of the present invention.

FIG. 21 illustrates operations of the above-described second embodiment of the present invention.

By the above-described operations, it is possible to freely set the probabilities of transitions from the SNT state to the WNT state, from the WNT state to the SNT state, from the WNT state to the WT state, from the WT state to the WNT state, and from the WT state to the ST state and from the ST state to the WT state.

For example, it is possible to set the probability of transition from the SNT state to the WNT to 50%, the probability of transition from the WNT state to the SNT to 10%, the probability of transition from the WNT state to the WT to 40%, the probability of transition from the WT state to the WNT to 20%, the probability of transition from the WT state to the ST to 10%, the probability of transition from the ST state to the WT to 70%, as shown in FIG. 21.

According to the transition states shown in FIG. 21, when a branch instruction occurs in the SNT state, it is changed into the WNT state in the probability of 50%.

Thus, it is possible to set the probability distribution of transition from one state to another state in a form of tables, as shown in FIG. 19, for example. Thereby, it is possible to set a condition such as to make it easy or hard to change to a specific state. Thereby, it is possible to reduce useless state transitions, and to reduce branch prediction misses.

Accordingly, in the second embodiment of the present invention, it is possible to use branch direction transition tables such as to reduce branch prediction misses. Thereby, it is possible to reduce pipeline bubbles occurring due to branch prediction misses in a pipeline processor. Thereby, it is possible to improve effective processing performance of microprocessor.

It is noted that, processes processed by the present invention may be communication processing processes, program processes of editor, printing processing processes, time management processes, file processing processes, processing processes of OS, and so forth, for example.

The present invention is not limited to the above-described embodiments, and variations and modifications may be made without departing from the scope of the present invention.

The present application is based on Japanese priority applications Nos. 2000-044642 and 2000-025769, filed on Feb. 22, 2000 and Feb. 2, 2000, respectively, the entire contents of which are hereby incorporated by reference.

What is claimed is:

1. An arithmetic and logic unit, comprising:
   a first part performing a branch prediction in response to a branch instruction;
   a second part updating a transition probability of the branch prediction according to whether a branch is actually made;
   a third part detecting that a process is switched; and a fourth part initializing branch prediction information when the third part detects that the process is switched; and wherein the fourth part fixedly performs initialization of the branch prediction information by determining an initialization value according to a comparison of a program counter value with a branch destination address and a determination of whether a branch prediction direction is backward taken (BT) or forward not taken (FN) to set the branch prediction information to the determined initialization value regardless of past branch prediction results, without depending on a particular process.

2. The arithmetic and logic unit as claimed in claim 1, wherein the fourth part performs initialization based on prediction information given to the branch instruction.

3. A branch prediction method, comprising:

performing a branch prediction in response to a branch instruction;

updating a transition probability of the branch prediction according to whether a branch is actually made;

detecting that a process is switched', and initializing branch prediction information when said detecting detects that the process is switched, and wherein said initializing includes fixedly performing initialization of the branch prediction information by determining an initialization value according to a comparison of a program counter value with a branch destination address and a determination of whether a branch prediction direction is backward taken (BT) or forward not taken (FN) to set the branch prediction information to the determined initialization value regardless of past branch prediction results, without depending on a particular process.

4. The method as claimed in claim 3, wherein said initializing comprises performing initialization based on prediction information given to the branch instruction.

5. An information processing apparatus comprising:

a first part performing a branch prediction in response to a branch instruction;

a second part updating a transition probability of the branch prediction according to whether a branch is actually made;

a third part detecting that a process is switched; and a fourth part initializing branch prediction information when the third part detects that the process is switched, and wherein the fourth part fixedly performs initialization of the branch prediction information by determining an initialization value according to a comparison of a program counter value with a branch destination address of the branch instruction and a determination of whether a branch prediction direction is backward taken (BT) or forward not taken (FN), to set the branch prediction information to the determined initialization value regardless of past branch prediction results, without depending on a particular process.

6. The information processing apparatus as claimed in claim 5, wherein the fourth part performs initialization based on prediction information given to the branch instruction.

7. A method of performing a branch prediction in response to a branch instruction, comprising:

detecting whether a process is switched; and setting the branch prediction to predetermined branch prediction information regardless of past branch prediction results upon detecting that the process is switched, and where the predetermined branch prediction information is initialized according to a branch destination address of the branch instructions without depending on a particular process, based on a determination of an initialization value according to a comparison of a program counter value with the branch destination address and a determination of whether a branch prediction direction is backward taken (BT) or forward not taken (FN).

8. A method of performing a branch prediction in response to branch instructions, comprising:

storing branch prediction information based on past branch results in relation to the branch instructions;

detecting whether a process switch has occurred based on a program count address; and setting a branch prediction in relation to one of the branch instructions to a predetermined branch prediction regardless of the stored branch prediction information upon detecting that the process has switched and the predetermined branch prediction is determined in accordance with a determination of an initialization value based on a comparison of a program counter value with a branch destination address and a determination of whether a branch prediction direction is backward taken (BT) or forward not taken (FN).

9. An arithmetic and logic unit, comprising:

a first part performing a branch prediction in response to a branch instruction;

a second part updating a transition probability of the branch prediction according to whether a branch is actually made;

a third part detecting that a process is switched; and a fourth part initializing branch prediction information when the third part detects that the process has switched, and wherein the fourth part performs the initialization of branch prediction information according to a branch destination of the branch instruction by determining an initialization value according to a comparison of a program counter value with a branch destination address and a determination of whether a branch prediction direction is backward taken (BT) or forward not taken (FN).

10. A branch prediction method, comprising:

performing a branch prediction in response to a branch instruction;

updating a transition probability of the branch prediction according to whether a branch is actually made;

detecting that a process is switched; and initializing branch prediction information when said detecting detects that the process has switched, and wherein said initializing comprises performing initialization according to a branch destination of the branch instruction by determining an initialization value according to a comparison of a program counter value with a branch destination address and a determination of whether a branch prediction direction is backward taken (BT) or forward not taken (FN).

11. An information processing apparatus, comprising:

a first part performing a branch prediction in response to a branch instruction;

a second part updating a transition probability of the branch prediction according to whether a branch is actually made;

a third part detecting that a process is switched; and a fourth part initializing branch prediction information when the third part detects that the process is switched; and wherein the fourth part performs said initializing branch prediction information according to a branch destination of the branch instruction by determining an initialization value according to a comparison of a program counter value with a branch destination address and a determination of whether a branch prediction direction is backward taken (BT) or forward not taken (FN).

12. A method of performing a branch prediction in response to a branch instruction, comprising:

setting the branch prediction to branch prediction information indicative of a branch prediction direction upon a switch from a first process to a second process;

initializing the branch prediction information by determining an initialization value based on a comparison of a program counter value with a branch destination address; and selectively outputting branch prediction direction information backward taken (BT) and branch direction information forward not taken (FN) based on the comparison such that when the branch destination address is smaller than the program counter value the branch prediction direction information backward taken (BT) is output and the branch prediction information is set to the determined initialization value.

* * * * *

UNITED STATES PATENT AND TRADEMARK OFFICE
CERTIFICATE OF CORRECTION

PATENT NO. : 7,085,920 B2
APPLICATION NO. : 09/736163
DATED : August 1, 2006
INVENTOR(S) : Koichi Yoshimi It is certified that error appears in the above-identified patent and that said Letters Patent is hereby corrected as shown below:

First Page Column 1 (Title), Line 4, change "BRACH" to --BRANCH--.

Column 1, Line 4, change "BRACH" to --BRANCH--.

Column 17, Line 22, after "switched" change "," to --;--.

Column 18, Line 3, change "instructions" to --instruction--.

Signed and Sealed this

Second Day of January, 2007

JON W. DUDAS
*Director of the United States Patent and Trademark Office*